(12) United States Patent
Zosimadis et al.

(10) Patent No.: US 7,793,839 B2
(45) Date of Patent: Sep. 14, 2010

(54) SYSTEM ENABLING THE EXCHANGE OF INFORMATION BETWEEN PRODUCTS

(75) Inventors: Peter Zosimadis, Brampton (CA); Paul Waterhouse, Selkirk (CA)

(73) Assignee: Smart Wave Technologies Corporation (CA)

( * ) Notice: Subject to any disclaimer, the term of this patent is extended or adjusted under 35 U.S.C. 154(b) by 537 days.

(21) Appl. No.: 11/833,693

(22) Filed: Aug. 3, 2007

(65) Prior Publication Data

US 2008/0029590 A1    Feb. 7, 2008

Related U.S. Application Data

(60) Provisional application No. 60/836,048, filed on Aug. 7, 2006.

(51) Int. Cl.
    *G06K 7/08* (2006.01)
(52) U.S. Cl. ..................................................... 235/451
(58) Field of Classification Search ................. 235/439, 235/451, 492
    See application file for complete search history.

(56) References Cited

U.S. PATENT DOCUMENTS

| | | | |
|---|---|---|---|
| 3,299,424 A | 1/1967 | Vinding | 340/10.3 |
| 3,427,614 A | 2/1969 | Vinding | 340/870.31 |
| 3,689,885 A | 9/1972 | Kaplan et al. | 340/152 T |
| 3,859,624 A | 1/1975 | Kriofsky et al. | |
| 3,920,149 A | 11/1975 | Fortino et al. | 222/1 |
| 4,019,181 A | 4/1977 | Olsson et al. | 343/6.5 |
| 4,297,050 A | 10/1981 | Gmelch | 404/10 |
| 4,314,373 A | 2/1982 | Sellers | 455/73 |
| 4,354,043 A | 10/1982 | Belko et al. | 568/445 |
| 4,388,524 A | 6/1983 | Walton | 235/380 |
| 4,459,149 A | 7/1984 | Moran et al. | 71/24 |
| 4,510,495 A | 4/1985 | Sigrimis et al. | 340/825.54 |
| 4,554,955 A | 11/1985 | Von Lersner et al. | 141/1 |
| 4,580,721 A | 4/1986 | Coffee et al. | 239/3 |

(Continued)

FOREIGN PATENT DOCUMENTS

EP    0825419 A2    2/1998

OTHER PUBLICATIONS

Supplementary European Search Report; EP 07 80 0429; Aug. 24, 2009; 6 pages.

(Continued)

*Primary Examiner*—Seung H Lee
(74) *Attorney, Agent, or Firm*—St. Onge Steward Johnston & Reens LLC (57) ABSTRACT

A system allowing the wireless transfer of data between a first device having a microcontroller and a second device when the first and second devices are positioned adjacent each other is described. The system includes a reader circuit and tag circuit. The reader circuit is operatively connected to the first device and provides oscillation energy to the tag circuit when the tag circuit is coupled to the reader circuit. The reader circuit receives coded information from the tag circuit and delivers the coded information to the microcontroller. The tag circuit includes a coil and logic enabling patterned oscillation at least two discrete frequencies such that the patterned oscillation is representative of coded information within the tag circuit. The system may be configured to a variety of product pairs, including consumer product pairs, to control the operation of the product pair or collect information about the operation of the product pair.

21 Claims, 4 Drawing Sheets

U.S. PATENT DOCUMENTS

| | | | |
|---|---|---|---|
| 4,629,164 A | 12/1986 | Sommerville | 239/69 |
| 4,646,090 A | 2/1987 | Mawhinney | |
| 4,660,742 A | 4/1987 | Ozdemir | 222/36 |
| 4,730,188 A | 3/1988 | Milheiser | 340/825 |
| 4,752,776 A | 6/1988 | Katzenstein | 340/825.54 |
| 4,791,285 A | 12/1988 | Ohki | 235/449 |
| 4,848,496 A | 7/1989 | Murakami et al. | 178/19 |
| 4,876,535 A | 10/1989 | Ballmer et al. | 340/825.34 |
| 4,926,996 A | 5/1990 | Eglise et al. | 194/212 |
| 5,099,227 A | 3/1992 | Geiszler et al. | 340/572 |
| 5,266,926 A | 11/1993 | Beigel | 340/572 |
| 5,436,441 A | 7/1995 | Inoue | 235/487 |
| 5,473,323 A | 12/1995 | Kreft | 340/870.31 |
| 5,550,536 A | 8/1996 | Flaxl | 340/825.54 |
| 5,559,507 A | 9/1996 | Beigel | 340/825.54 |
| 5,604,681 A | 2/1997 | Koeninger | 364/509 |
| 5,738,153 A | 4/1998 | Gerling et al. | 141/83 |
| 5,838,233 A | 11/1998 | Hawes et al. | |
| 5,875,921 A | 3/1999 | Osgar et al. | 222/1 |
| 6,202,927 B1 * | 3/2001 | Bashan et al. | 235/451 |
| 6,431,400 B1 | 8/2002 | O'Maley et al. | 222/41 |
| 6,554,999 B2 | 4/2003 | Brunsting | 210/222 |
| 6,626,355 B2 | 9/2003 | Sasse et al. | 235/375 |
| 6,649,829 B2 | 11/2003 | Garber et al. | 174/47 |
| 6,822,560 B2 | 11/2004 | Geber et al. | 340/439 |
| 6,879,876 B2 | 4/2005 | O'Dougherty et al. | 700/231 |
| 6,897,374 B2 | 5/2005 | Garber et al. | 174/47 |
| 6,990,391 B1 | 1/2006 | Cunha et al. | 700/237 |
| 7,028,861 B2 | 4/2006 | Sayers et al. | 222/1 |
| 7,075,019 B2 | 7/2006 | Bergman et al. | 177/59 |
| 7,374,089 B2 * | 5/2008 | Fujii, Tatsuya | 235/451 |
| 7,543,746 B2 * | 6/2009 | Mizutani et al. | 235/451 |
| 2001/0020148 A1 | 9/2001 | Sasse et al. | 604/65 |
| 2003/0193398 A1 | 10/2003 | Geber et al. | 340/568.1 |
| 2005/0017073 A1 | 1/2005 | Fernandez | |
| 2005/0033544 A1 | 2/2005 | Brooks et al. | |
| 2005/0127090 A1 | 6/2005 | Sayers et al. | 222/1 |
| 2005/0237198 A1 | 10/2005 | Waldner et al. | 340/572.7 |
| 2006/0124662 A1 | 6/2006 | Reynolds et al. | 222/23 |
| 2006/0131329 A1 | 6/2006 | Sayers et al. | 222/105 |
| 2007/0229273 A1 * | 10/2007 | Hoemann et al. | 340/572.4 |

OTHER PUBLICATIONS

International Search Report, Sep. 13, 2007, 3 pages.
Canadian Office Action; Application No. 2,658,613; Jun. 9, 2010; 4 pages.

* cited by examiner

SYSTEM ENABLING THE EXCHANGE OF INFORMATION BETWEEN PRODUCTS

CROSS-REFERENCE TO RELATED APPLICATIONS

This application claims the benefit of, under 35 U.S.C. 119 (e), U.S. Provisional Patent Application No. 60/836,048, filed Aug. 7, 2006, which application is hereby incorporated by reference herein.

FIELD OF THE INVENTION

A system allowing the wireless transfer of data between a first device having a microcontroller and a second device when the first and second devices are positioned adjacent each other is described. The system includes a reader circuit and tag circuit. The reader circuit is operatively connected to the first device and provides oscillation energy to the tag circuit when the tag circuit is coupled to the reader circuit. The reader circuit receives coded information from the tag circuit and delivers the coded information to the microcontroller. The tag circuit includes a coil and logic enabling patterned oscillation at least two discrete frequencies such that the patterned oscillation is representative of coded information within the tag circuit. The system may be configured to a variety of product pairs, including consumer product pairs, to control the operation of the product pair or collect information about the operation of the product pair.

BACKGROUND OF THE INVENTION

In the consumer product market, many products produce revenue for the manufacturer through the sale of associated consumable products after the original or primary product is purchased. For example, a manufacturer may give a product such as a shaver handle away knowing that they will make money from the consumer selling the consumable razors. Similarly, a manufacturer may sell a larger piece of equipment such as a fax machine or printer at cost with the understanding that they will make a profit selling the toner or toner cartridges. The combination of different pairs or groups of supporting and consumable products run across the full range of consumer and industrial products including household, office, food and a wide variety of industrial products.

Within such markets, competitors will often copy the consumable portion of the product and undercut prices of the original equipment manufacturer (OEM) to sell the consumable product to consumers. As a result, the OEM manufacturers who have invested substantial money in the research and development of their products continue to look for ways to make it more difficult for their competitors to utilize the competitor's products within the original equipment.

As one example, there are currently many products that use physical keying systems to prevent unauthorized products from being used within devices. Mechanical keying systems require that the physical geometry between the original equipment and consumable product must match. Such systems may include physical rings with specific geometry (male and female) that are made to fit together, keyed slots, non-standard dimensions and other systems. A general example of such a system may be aligned slots between products such as the core of a paper towel roll that must be inserted into a corresponding slotted core of a dispenser.

The challenge with physical or mechanical systems is that they are easily defeated either by the competitor or by the consumer. That is, the competitor may simply manufacture products with similar geometries or the consumer by using various tools will modify the geometry of the OEM product or the competitor's product to make the products fit, thus defeating the intentions of the OEM.

Still further, another common method of defeating physical systems is simply to refill the container if liquids or other substances are being dispensed. For example, a restaurant may use the dispensing equipment of a name-brand manufacturer but then re-fill the dispenser with a generic product thereby "passing-off" the generic product as that of the name-brand. Not only does this action deny the OEM of revenue from the re-fill product, it also diminishes or degrades the value of the name-brand product.

In the past, other keying systems have been utilized that require both physical and electronic connection between two or more devices. This type of physical/electronic system will often add a significant constraint to the design of the OEM product and is often limited by typical problems associated with maintaining a physical contact between devices such as dirt and water contamination and/or corrosion by environmental factors that may ultimately affect the reliability of the product and lead to customer dissatisfaction.

As a result, there exists a need for an improved system and methodology that enhances the ability of OEM manufacturers from having competitors produce consumable products that can be utilized with the OEM equipment.

In particular, there has been a need for an inexpensive wireless system that provides effective electronic coupling between devices wherein the coupling enables the exchange of information between the devices in order that the origin and/or authenticity of one device to another can be determined in order to enable or deny the cooperation between those two devices.

SUMMARY OF THE INVENTION

In accordance with the invention, there is provided a system allowing the wireless transfer of data between a first device having a microcontroller and a second device when the first and second devices are operatively positioned adjacent each other, the system comprising a reader circuit and tag circuit:

a. the reader circuit operatively connected to the first device and having a receiver coil and a transmit coil for providing oscillation energy to the tag circuit when the tag circuit is coupled to the reader circuit and for receiving coded information within the tag circuit and delivering the coded information to the microcontroller;

b. the tag circuit for placement adjacent the reader circuit, the tag circuit having a tag coil for patterned oscillation at least two discrete frequencies and for coupling to the reader circuit such that the receiver coil, transmit coil and tag coil all oscillate at the same frequency when the reader circuit and tag circuit are coupled, the patterned oscillation representative of coded information within the tag circuit.

In various embodiments of the system, the reader circuit includes an output circuit for delivering the coded information to the microcontroller and/or the coded information is converted to binary information on the basis of the tag coil, receiver coil and transmit coil oscillating at two discrete frequencies. In another embodiment, power for the tag circuit is obtained from the oscillation energy of the tag coil.

In another embodiment, the coded information is binary information including an enable/disable bit. In one embodiment, the enable/disable bit can be permanently altered by an instruction from the reader circuit such as a voltage change. In one embodiment, the coded information may include any one of or a combination of a manufacturer's code, a distributor's code and a serial number.

In a further embodiment, the reader circuit is operably connected to the first device and the tag circuit is operably connected to the second device and the first device includes a microcontroller operatively connected to the reader circuit for interpreting the coded information within the tag circuit and wherein operative cooperation between the first and second devices is determined based on microcontroller interpretation of the coded information within the tag circuit.

In a further still embodiment, the reader circuit includes a power switch responsive to the actuation of the first product and the microcontroller measures the time of actuation of the first product to determine the consumption of a consumable product within the second product. The microcontroller may prevent further actuation of the first product if the microcontroller determines that a pre-determined quantity of the consumable product has been consumed.

In a more specific embodiment, the invention provides a system for allowing the wireless transfer of data between a first device and a second device when the first and second devices are operatively positioned adjacent each other, the system comprising:
  a. a reader circuit operatively connected to the first device, the reader circuit including
    i. a receiver coil and a transmit coil operatively connected to each other and spatially separated from each other;
    ii. an amplifier operatively connected to the transmit coil;
    iii. a power supply operatively connected to the receiver coil; and,
    iv. an output circuit operatively connected to the receiver coil;
  b. a tag circuit for placement adjacent the reader circuit, the tag circuit including
    i. a tag coil;
    ii. a first capacitor operatively connected to the tag coil.
    iii. a second capacitor in a second parallel circuit having a logic driven switch for switching the second capacitor into and out of circuit with the first capacitor to induce a second resonant frequency in the tag coil when energized;
  wherein operative placement of the tag circuit adjacent an energized reader circuit induces oscillation of the tag coil at the first resonant frequency and activates the logic driven switch to induce oscillation of the tag coil at the second resonant frequency and wherein tag coil oscillations at the first and second resonant frequencies induce corresponding oscillations in the receiver coil for delivery to the output circuit.

BRIEF DESCRIPTION OF THE DRAWINGS

The invention is described with reference to the drawings in which.

DETAILED DESCRIPTION OF THE INVENTION

With reference to the figures, a system 10 allowing the wireless transfer of data between two devices when the devices are operatively positioned adjacent each other is described. The system includes two main circuits, a reader circuit 101 and a tag circuit 102. In the context of this description, the reader circuit 101 may be located on a first product and the tag circuit located on a second product where it is desired that the two products are coupled to enable the interaction and the exchange of information between the two products.

Representative examples of such products and the potential information exchanged between such products are shown in Table 1.

TABLE 1

| Representative Product Pairs | | |
| --- | --- | --- |
| Product A | Product B | Data |
| Paper towel dispenser | Paper towel roll | Operation Consumption |
| Liquid soap dispenser | Liquid soap refill | Operation Consumption |
| Laser printer | Printer cartridge | Operation Consumption |
| Food Dispenser | Food | Operation Shelf Life |

Reader Circuit Design and Function

The general function of the reader circuit is to read information contained within the tag circuit when the tag circuit is within the operating distance of the reader circuit. Once the tag circuit is within operating distance, coded information contained within the tag will be output to the reader circuit for interpretation. More specifically, the reader circuit includes two uncoupled antennae that require the physical presence of an input antenna within the tag circuit to create a coupled connection and thereby allow the exchange of the coded information.

Figure 1:
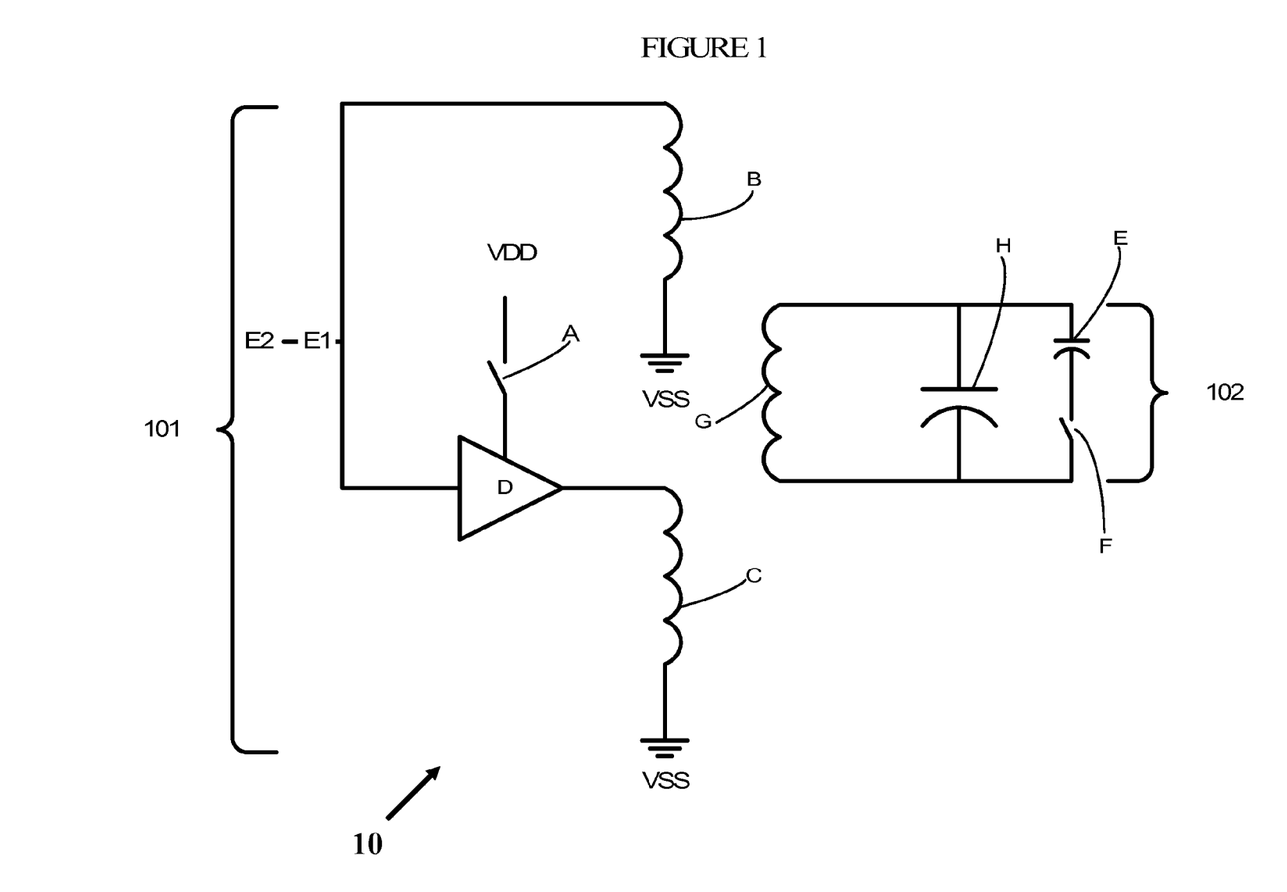
FIG. 1 is a schematic diagram of a coupling system in accordance with the invention showing a reader and a tag circuit.

As shown in FIG. 1, the reader circuit 101 includes a power supply switch A, receiver antenna B, a transmit antenna C, an amplifier D and microcontroller output E1. The tag circuit 102 includes input antenna G, resonant capacitor H and logic switch F with switch capacitor E. In operation, as power to the reader circuit is switched on, the transmit antenna C of the reader will cause the input antenna G of the tag circuit to begin oscillating at the resonate frequencies (as determined by the resonant and switch capacitors of the tag circuit and explained in greater detail below) which will be transmitted to the receiver antenna B whose oscillation output may then be read and interpreted by an appropriate microcontroller E2 through microcontroller output E1.

The receive B and transmit C coils are designed such that they do not have enough gain to self-couple such that it is only through the physical presence of the tag circuit 102 in proximity to the reader circuit that allows enough energy to be coupled between the receive B and transmit C coils to enable oscillation at the resonate frequency of the tag circuit.

The reader circuit is controlled by power switch A such that when the power switch is closed, the circuit operates and when the switch is opened, the circuit is turned off. The placement or location of the switch in a combined pair of reader circuit and tag circuit can be controlled by the physical design of two coupled products.

When power is turned on to power switch A, the transmit coil C is energized and will inherently attempt to couple with receive coil B. As a result of the physical separation and power supply, the receive and transmit coils will not couple unless the tag circuit 101 is within operating range.

As soon as the tag circuit 102 is in range, energy will flow from the transmit coil C into the input coil G, then through B.

In approximately 0.005 seconds, after the introduction of the tag circuit 102, the system is fully oscillating and fully functional.

Once the system is fully oscillating, the reader circuit 101 outputs the oscillation signal (containing coded information within the tag circuit) via output line E1 to a standard microcontroller E2 which can interpret the signal and base decisions on that information.

The transmit coil C can also be used to produce a specific RF signal which can enable or disable a special enable bit on each tag as will be explained in greater detail below.

Tag Circuit Design and Function

As indicated, the tag circuit includes a resonant capacitor H, a switching capacitor E and a logic driven switch F that in combination allows the programmed and cyclical adjustment of the resonant frequency of the tag circuit.

Generally, the base resonant frequency of the tag circuit is determined by the resonant capacitor H which in combination with input antenna G and resonant capacitor H creates a tuned coil that will naturally resonate at a specific or discrete frequency. In preferred embodiments of the invention, discrete resonant frequencies of the system will be designed to operate at discrete values in the 72 kHz to 900 kHz range although it is understood that the operating frequency range can be expanded if required by the design of specific product pairs.

Figure 2:
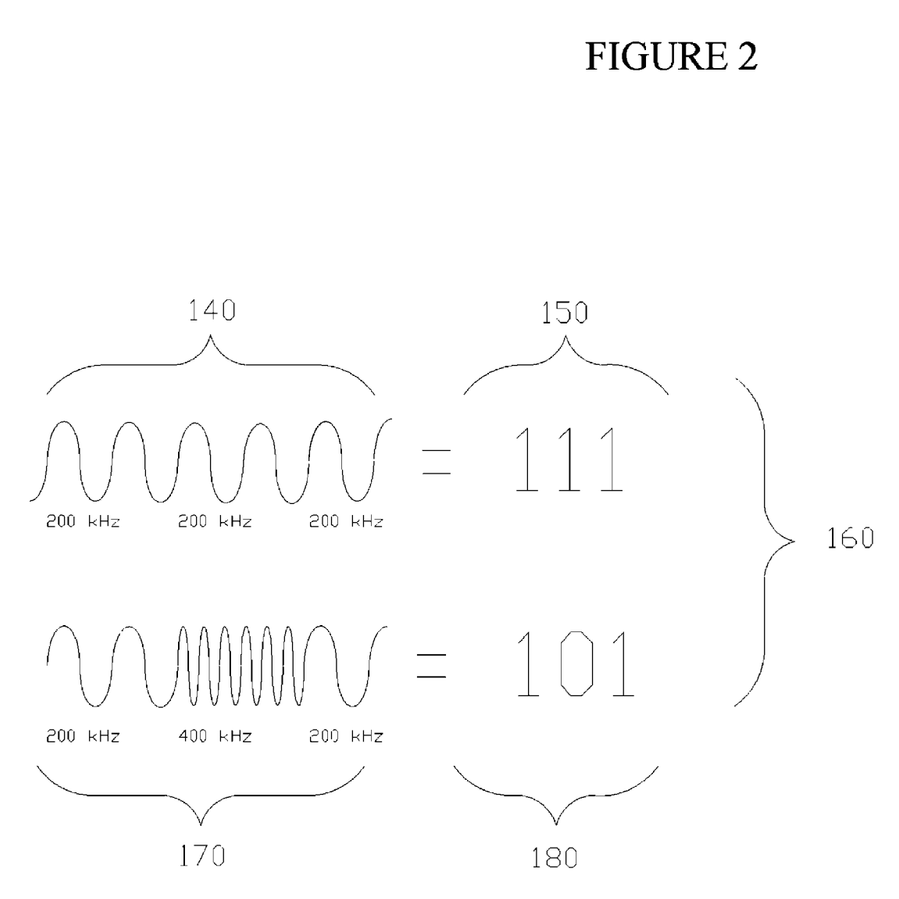
FIG. 2 is a schematic diagram of a representative frequency output of a tag circuit in accordance with the invention.

The switching capacitor E and logic controlled switch F are in parallel with the resonant capacitor C and enable the operative change of the resonant frequency of the tag circuit to a second discrete value. As shown in FIG. 2, as the system oscillates, logic controlled switch F will periodically open and close in accordance with its design such that the resonant frequency of the tag will change between two discrete values depending on whether the logic controlled switch is opened or closed.

For example, with the logic switch F open, the system will oscillate at the discrete resonant frequency of the resonant capacitor H and will produce a steady state oscillation signal 140 as shown schematically in FIG. 2.

As the logic switch C is closed, the switching capacitor E is switched into the circuit which will change the discrete resonant frequency of the tag as determined by the combined capacitance of the resonant capacitor H and switch capacitor E. As the switching capacitor is switched out of the circuit, the resonant frequency reverts to the discrete resonant frequency of the resonant capacitor H. Thus, by switching the switching capacitor into and out of the circuit a representative signal 170 as shown in FIG. 2 is produced.

As the resonant frequency of the tag is changed, a corresponding change in frequency is measured at receiver coil B which is then delivered to microcontroller output E1 and microcontroller E2.

These signals can be processed using known techniques to produce a digital output shown representatively as 150 (binary signal 111) and 180 (binary signal 101) in FIG. 2. Through appropriate coding and microcontroller interpretation as known to those skilled in the art, the signals can be interpreted and utilized to provide useful output such as whether a desired product pairing is authentic or not.

Coded Information

Figure 3:
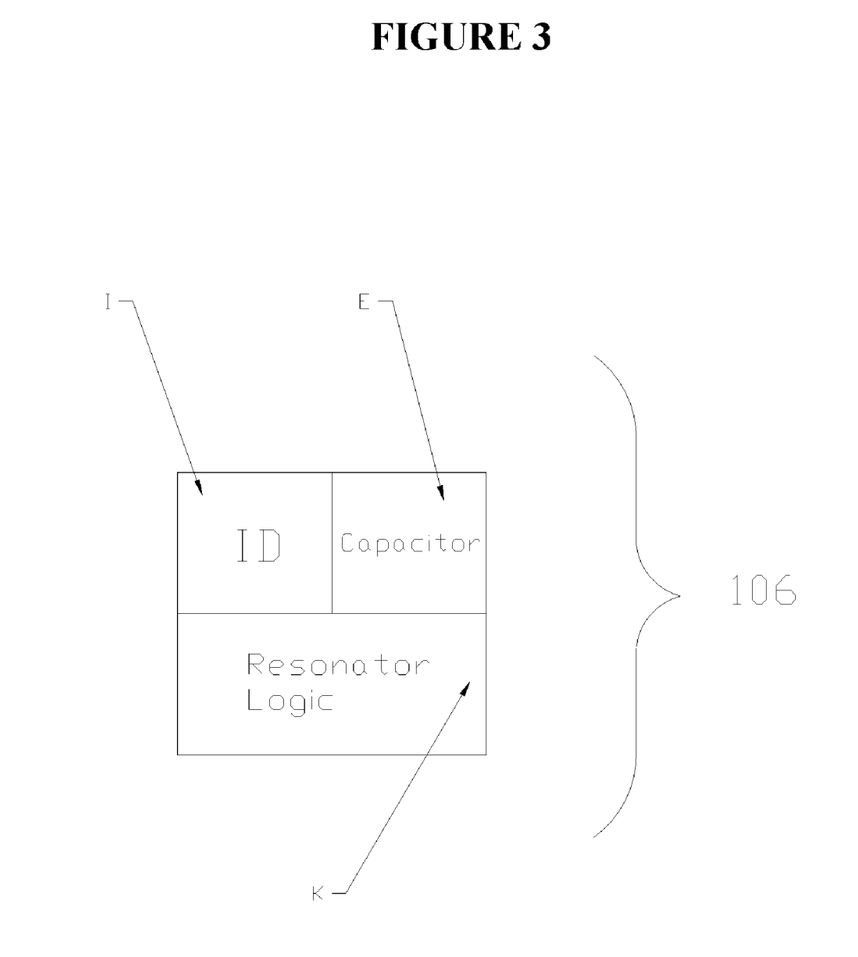
FIG. 3 is a schematic diagram of a coded information subsystem in accordance with one embodiment of the invention; and, FIG. 4 is a schematic diagram of a representative example of coded information in accordance with one embodiment of the invention.

With reference to FIG. 3, an embodiment of the tag circuit is described that enables unique identification codes or coded information to be incorporated into the tag circuit. As shown, an identification system 106 includes identification logic I, switching capacitor E and resonator logic K.

The identification system 106 generally controls the timing of when the switching capacitor E is switched into and out of the circuit. More specifically, when the system is oscillating, the resonator logic K detects the oscillation and then begins to switch the switching capacitor into and out of the circuit. The time at which E is switched into and out of the circuit is determined by the identification logic I. The identification logic I is operatively connected to the resonator logic K such that the output of the reader 101 to E1 produces a patterned frequency corresponding to the identification logic I.

The identification logic I can be pre-programmed or programmed after the circuit 102 is manufactured. That is, the identification logic can be read-only or programmable.

In certain embodiments, it is desirable to ensure that no two tags have the same ID code allowing the unique identification of products.

Figure 4:
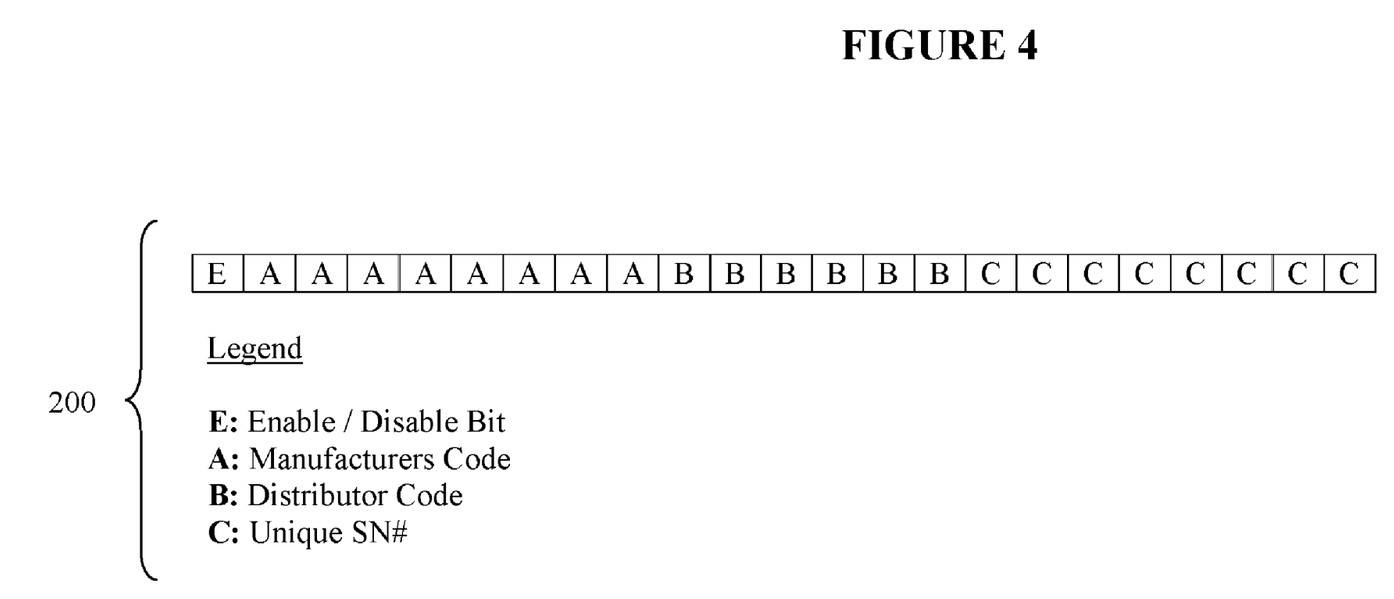

With reference to FIG. 4, a representative example of identification logic 200 is described. It is understood that other identification logic may be utilized as would be understood by those skilled in the art. That is, any number of protocols or techniques can be used to provide a unique identification to various products or product pairs.

As shown, the ID code can be subdivided into several sub-sections as depicted in the legend in FIG. 4 including an enable/disable bit, a manufacturer's code, a distributor's code and a unique serial number.

Representative functionality associated with an ID code is described in the context of a paper towel dispenser and paper roll refill where the reader circuit 101 is located in the paper towel dispenser and the tag circuit 102 is located in the paper towel refill. In this example, the paper towel dispenser is designed to operate with an approved paper towel roll and includes a microprocessor a) enabling the evaluation of data received from a tag circuit, b) enabling the determination of the length of time the paper towel roll is operated in the dispenser and c) having the ability to alter the ID logic within the tag circuit. The paper towel roll dispenser may be manual or automatic.

In operation, a paper towel roll is installed within the dispenser such that the reader circuit and tag circuit are physically located adjacent each other. When paper towels are not being dispensed, no power is delivered to the reader circuit. When a user approaches and interacts with the dispenser to dispense paper towel, power is switched on to the reader circuit allowing the reader circuit and tag circuit to interact and tag data or coded information to be received by the reader circuit.

After the reader circuit and tag circuit have reached a steady state (ie oscillating), the microcontroller interprets the data received from the tag circuit. For example, the microcontroller may check the enable/disable bit to ensure the tag circuit is allowed to operate within the dispenser or not, and/or the manufacturer, distributor and serial number codes may also be checked. The receipt of information from the tag circuit allows the microcontroller to make operating decisions on the basis of that information.

With respect to the enable/disable bit, if the microcontroller recognizes the enable/disable bit as enabled, the microcontroller may use that information to allow the dispenser to turn on. If the enable/disable bit is recognized as disabled, the microcontroller would generally not allow the dispenser to turn on or allow paper towels to be dispensed.

In further embodiments and, in various product pairs, it may be desirable to change the enable/disable bit from enabled to disabled or from disabled to enabled so as to ensure that the product pair is operating under the manufacturer's guidelines. For example, it may be desirable for the microcontroller to disable a tag circuit after a specific time, after a number of actions have taken place or other criteria set by the manufacturer. In the paper towel dispenser example, if the paper towel dispenser is programmed to recognize that an authorized paper roll can deliver 300 meters of paper towel, the enable bit will be disabled if the microcontroller determines that 300 m (plus a suitable allowance) of paper towel has been dispensed. That is, if the microcontroller of an authorized dispenser delivers more than 300 m of paper towel, this would suggest that the paper roll has been tampered with and that an unauthorized product may be being used in the dispenser. In this example, the dispenser would calculate the amount of paper towel dispensed on the basis of the cumulative, measured time of operation and the known speed of delivery of the paper towel.

In other product pairs, appropriate calculations and control mechanisms can be implemented to prevent the interaction between products if pre-determined conditions of operation are exceeded or violated.

As another example, in a liquid dispensing system, the system can be used to meter the quantity of liquid dispensed. For example, if 1 ml of liquid soap is dispensed from a soap dispenser with each use, a 1000 ml dispenser should only be able to operate for 1000 dispenses before requiring to be refilled. Accordingly, microcontroller logic within the dispenser will detect if the number of uses exceeds the maximum allowable (possibly for a given serial number) thus enabling operation of the soap dispenser to be stopped if the number is exceeded.

In a perishable food product pairing, access to the perishable food product may be denied after an expiry date irrespective of whether the allowed quantity of food has been dispensed.

The ability to permanently disable a tag can be achieved using known techniques to alter the state of a specific logic bit such as using a high voltage signal to change the state of a bit.

Other codes, including a manufacturer's code can be included to allow different manufacturers of a similar product to have customized identifications. Such information may be beneficial to ensure that only those manufacturers with approved codes are producing certain products.

The use of other coded information such as a distributor's code allows a manufacturer to sub-divide approval for the sale or use of products within a particular geographical jurisdiction. For example, a manufacturer may license a distributor to sell product within a particular jurisdiction and not outside that jurisdiction. By incorporating a distributor code within a tag, a manufacturer can ensure that products can be used in specific jurisdictions only by denying those products having an incorrect distribution code from operating within certain machines.

A unique serial number can also be added to allow for further information to be delivered back to various databases for data evaluation, data mining, and other purposes.

In still further embodiments, in certain product pairs, the reader may be operatively connected to the internet enabling the manufacturer to query the product pair for consumption monitoring so as to enable efficient delivery of replacement product to a user. For example, in a laser printer connected to a network, the reader and tag system can monitor toner consumption and automatically report that consumption information over the network to a manufacturer who can deliver a replacement toner cartridge to the user before the cartridge runs out. Similar product consumption monitoring can be accomplished in a wide range of other products so as to facilitate "just in time" inventory control to a greater range of products.

The manufacture and bulk cost of the technology described herein is significantly advantaged over past radio frequency (RF) systems wherein the reader circuit and tag circuit can be manufactured from commonly available, low cost materials as well as custom low cost CMOS and Application Specific Integrated Circuit (ASIC) components. Tag circuit 102 can be mass produced with the result that the unit cost of the tag circuit can be lowered to $0.10 or less in bulk quantities. The reader circuit cost can be as little as $0.50 or less in bulk quantities.

Importantly, the tag circuit does not require its own power supply as the tag circuit receives sufficient energy from the reader circuit through the coupling process. Moreover, the reader circuit can be powered by a small low voltage (3 volt) DC battery that in many applications could provide sufficient power for several years of operation.

What is claimed is:

1. A system allowing the wireless transfer of data between a first device having a microcontroller and a second device when the first and second devices are operatively positioned adjacent each other, the system comprising a reader circuit and tag circuit:

the reader circuit operatively connected to the first device and having a receiver coil and a transmit coil for providing oscillation energy to the tag circuit when the tag circuit is coupled to the reader circuit and for receiving coded information within the tag circuit and delivering the coded information to the microcontroller;

the tag circuit for placement adjacent the reader circuit, the tag circuit having a tag coil for patterned oscillation at least two discrete frequencies and for coupling to the reader circuit such that the receiver coil, transmit coil and tag coil all oscillate at the same frequency when the reader circuit and tag circuit are coupled, the patterned oscillation representative of coded information within the tag circuit.

2. A system as in claim 1 wherein the reader circuit includes a power supply operatively connected to the receiver coil.

3. A system as in claim 1 wherein the reader circuit includes an output circuit for delivering the coded information to the microcontroller.

4. A system as in claim 1 wherein the coded information is converted to binary information on the basis of the tag coil, receiver coil and transmit coil oscillating at two discrete frequencies.

5. A system as in claim 1 wherein the tag circuit includes a first capacitor for defining a first discrete oscillation frequency.

6. A system as in claim 1 wherein the tag circuit includes a second capacitor for defining a second discrete oscillation frequency.

7. A system as in claim 6 wherein the second capacitor is connected to the tag circuit by a logic driven switch.

8. A system as in claim 7 wherein the logic driven switch is operatively driven by coded information within the tag circuit.

9. A system as in claim 8 wherein the coded information is binary information including an enable/disable bit.

10. A system as in claim 9 wherein the enable/disable bit can be permanently altered by an instruction from the reader circuit.

11. A system as in claim 10 wherein the instruction is a voltage change.

12. A system as in claim 8 wherein the coded information includes a distributor's code.

13. A system as in claim 8 wherein the coded information includes a serial number.

14. A system as in claim 8 wherein the coded information includes a manufacturer's code.

15. A system as in claim 1 wherein the first and second resonant frequencies are interpreted as a binary signal.

16. A system as in claim 1 wherein power for the tag circuit is obtained from the oscillation energy of the tag coil.

17. A system as in claim 1 wherein the reader circuit is operable from a low power battery.

18. A system as in claim 1 wherein the reader circuit is operably connected to the first device and the tag circuit is operably connected to the second device and wherein the first device includes a microcontroller operatively connected to the reader circuit for interpreting the coded information within the tag circuit and wherein operative cooperation between the first and second devices is determined based on microcontroller interpretation of the coded information within the tag circuit.

19. A system as in claim 1 wherein the reader circuit includes a power switch responsive to the actuation of the first product and the microcontroller measures the time of actuation of the first product to determine the consumption of a consumable product within the second product.

20. A system as in claim 19 wherein the microcontroller will prevent further actuation of the first product if the microcontroller determines that a predetermined quantity of the consumable product has been consumed.

21. A system for allowing the wireless transfer of data between a first device and a second device when the first and second device are operatively positioned adjacent each other, the system comprising:

a reader circuit operatively connected to the first device, the reader circuit including a receiver coil and a transmit coil operatively connected to each other and spatially separated from each other;

an amplifier operatively connected to the transmit coil;

a power supply operatively connected to the receiver coil; and, an output circuit operatively connected to the receiver coil;

a tag circuit for placement adjacent the reader circuit, the tag circuit including a tag coil;

a first capacitor operatively connected to the tag coil;

a second capacitor in a second parallel circuit having a logic driven switch for switching the second capacitor into and out of circuit with the first capacitor to induce a second resonant frequency in the tag coil when energized;

wherein operative placement of the tag circuit adjacent an energized reader circuit induces oscillation of the tag coil at the first resonant frequency and activates the logic driven switch to induce oscillation of the tag coil at the second resonant frequency and wherein tag coil oscillations at the first and second resonant frequencies induce corresponding oscillations in the receiver coil for delivery to the output circuit.

* * * * *